US009350759B1

United States Patent
Kitchen et al.

(10) Patent No.: US 9,350,759 B1
(45) Date of Patent: May 24, 2016

(54) NETWORK SECURITY APPLIANCE TO IMITATE A WIRELESS ACCESS POINT OF A LOCAL AREA NETWORK THROUGH COORDINATION OF MULTIPLE RADIOS

(71) Applicants: Darren Kitchen, San Francisco, CA (US); Sebastian Kinne, Otterfing (DE)

(72) Inventors: Darren Kitchen, San Francisco, CA (US); Sebastian Kinne, Otterfing (DE)

(73) Assignee: HAK5 LLC, San Francisco, CA (US)

( * ) Notice: Subject to any disclaimer, the term of this patent is extended or adjusted under 35 U.S.C. 154(b) by 0 days.

(21) Appl. No.: 14/742,729

(22) Filed: Jun. 18, 2015

(51) Int. Cl.
*H04L 29/06* (2006.01)
*H04L 12/24* (2006.01)

(52) U.S. Cl.
CPC ............ *H04L 63/1466* (2013.01); *H04L 41/28* (2013.01); *H04L 63/02* (2013.01)

(58) Field of Classification Search
CPC ...... H04L 63/1466; H04L 63/02; H04L 41/28
See application file for complete search history.

(56) References Cited

U.S. PATENT DOCUMENTS

| | | | | |
|---|---|---|---|---|
| 7,536,723 B1 * | 5/2009 | Bhagwat | ............. | H04L 12/2602 726/22 |
| 7,970,894 B1 * | 6/2011 | Patwardhan | .......... | H04W 12/12 370/254 |
| 8,145,136 B1 * | 3/2012 | Bharghavan | .......... | H04W 24/06 379/1.01 |
| 2008/0052779 A1 * | 2/2008 | Sinha | .................. | H04L 63/1441 726/22 |
| 2008/0098476 A1 * | 4/2008 | Syversen | ............ | H04L 63/0227 726/23 |
| 2014/0298469 A1 * | 10/2014 | Marion | .................... | G06F 21/55 726/23 |

OTHER PUBLICATIONS

O'Connor et al., "honeyM: A Framework for Implementing Virtual Honeyclients for Mobile Devices", WiSec, Mar. 2010, pp. 129-138.*
Haddadi et al., "Wireless Intrusion Detection System Using a Lightweight Agent", IEEE, 2010, pp. 84-87.*

* cited by examiner

*Primary Examiner* — Matthew Smithers
(74) *Attorney, Agent, or Firm* — Raj Abhyanker, P.C.

(57) ABSTRACT

Disclosed are methods and systems of a network security appliance to imitate a wireless access point of a local area network through coordination of multiple radios. In one aspect, a network security appliance includes (1) at least one supporting radio and (2) a communication radio. The at least one supporting radio determines if an access point is available in a local area network through a sniffing algorithm, determines if a client device is visible in the local area network, and injects at least one data packet into the client device based on either a command from an operator of the network security appliance and/or an automatic algorithm determined based on a set of preferences. The communication radio wirelessly imitates the access point of the local area network such that the client device is connected to a wide area network through the communication radio that is wirelessly imitating the access point.

20 Claims, 10 Drawing Sheets

| AVAILABLE ACCESS POINTS 504 | CONNECTED CLIENT DEVICES 506 | CLIENT DEVICE CONNECTION HISTORY 200 | UNCONNECTED CLIENT DEVICES 508 | CLIENT DEVICE CONNECTION HISTORY 200 |
|---|---|---|---|---|
| Living Room Wi-Fi | Malcolm's Cell Phone | Living Room Wi-Fi<br>Starbucks Wi-Fi | Malcolm's Tablet | Bedroom Wi-Fi<br>Target Wi-Fi |
| | Malcolm's Computer | Living Room Wi-Fi<br>Target Wi-Fi | Inara's Phone | Starbucks Wi-Fi |
| | Kaylee's Tablet | Living Room Wi-Fi<br>Starbucks Wi-Fi<br>Persephone Wi-Fi<br>Coffee Bean Wi-Fi | Inara's Computer | Peet's Coffee Wi-Fi |
| | Wash's TV | Living Room Wi-Fi | Jayne's Computer | Firefly Wi-Fi<br>Starbucks Wi-Fi<br>Living Room Wi-Fi |
| Bedroom Wi-Fi | --- | --- | River's Phone | Coffee Bean Wi-Fi<br>Reaver Wi-Fi<br>Target Wi-Fi<br>Starbucks Wi-Fi |
| Study Wi-Fi | Zoe's Printer | Study Wi-Fi<br>Living Room Wi-Fi | Simon's Phone | Study Wi-Fi<br>Living Room Wi-Fi<br>Miranda Wi-Fi<br>Serenity Wi-Fi |
| | Zoe's Cell Phone | Study Wi-Fi<br>Starbucks Wi-Fi<br>Miranda Wi-Fi | | |
| ... | ... | ... | ... | ... |

TABLE VIEW 550

FIGURE 5

NETWORK SECURITY APPLIANCE TO IMITATE A WIRELESS ACCESS POINT OF A LOCAL AREA NETWORK THROUGH COORDINATION OF MULTIPLE RADIOS

FIELD OF TECHNOLOGY

This disclosure relates generally to network security technology and, more particularly, to a method, a device and a system of a network security appliance to imitate a wireless access point of a local area network through coordination of multiple radios.

BACKGROUND

A network security appliance may perform a penetration testing and vulnerability assessment function on a hard-wired network. The hard-wired network may require each node on the network to be physically connected to each other. For example, each computing device sharing the hard-wired network may require cables (e.g., Ethernet cables) to connect to each other. These cables may be cumbersome and difficult to route through buildings (e.g., buildings may be geographically dispersed, routing through walls may be unsightly and/or challenging).

Therefore, wireless nodes may be added to the hard-wired network. However, a heterogeneous topology (e.g., with wired and wireless nodes) and/or a pure wireless topology of a network may be incompatible with the network security appliance performing the penetration testing and vulnerability assessment function. The network security appliance may be slow, inefficient, and unable to respond to dynamic conditions within the network and may have difficulty managing the numerous devices associated with the network that are connected wirelessly. Therefore devices that are connected to the network wirelessly may be susceptible to intrusion from external parties. These intrusions may cost companies and organizations running a heterogeneous and/or wireless network money, time, and/or critical sensitive information. Therefore, security of the network may be compromised.

SUMMARY

Disclosed are a method and/or a system of a network security appliance to imitate a wireless access point of a Local Area Network (LAN) through coordination of multiple radios.

In one aspect, a network security appliance includes (1) at least one supporting radio and (2) a communication radio. The at least one supporting radio determines if an access point is available in a LAN through a sniffing algorithm, determines if a client device is visible in the LAN, and injects at least one data packet into the client device based on either a command from an operator of the network security appliance and/or an automatic algorithm determined based on a set of preferences of the network security appliance. The communication radio wirelessly imitates the access point of the LAN such that the client device is connected to a Wide Area Network (WAN) through the communication radio that is wirelessly imitating the access point.

The communication radio may wirelessly imitate a different access point that was previously communicatively coupled with the client device (e.g., by accessing a connection history of the client device through at least one supporting radio through the injection of at least one data packet). The at least one data packet may automatically disconnect the client device from the access point when the client device is connected to the access point. The at least one data packet may include a set of instructions that execute on the client device in a manner such that the client device automatically requests a connection to the communication radio when the set of instructions execute on the client device. The at least one data packet may convey to the client device that the communication radio is the access point.

The WAN may be an Internet network, a secure private network, and/or a distributed network. The at least one supporting radio and/or the communication radio may be on a single printed circuit board forming the network security appliance. The communication radio may be a rogue access point to operate as a wireless access point installed on a secure company network without explicit authorization from an administrator of the LAN. The rogue access point formed by the communication radio may optionally permit the operator of the network security appliance to conduct a man-in-the-middle attack. The at least one supporting radio may perform a function such as a packet injection function, a packet analysis function, a packet generation function, and/or a packet sniffing function. The client device may be specifically targeted by the network security appliance based on a unique identifier associated with the client device. The network security appliance may inject a series of packets to ensure that the client device that is specifically targeted trusts that the communication radio is the access point.

The network security appliance may transmit to the operator any one of the following: (1) an access point list that describes all the access points available in the LAN, (2) a connected client device list that describes all the client devices connected to the access points in the access point list in the LAN, and/or (3) an unconnected client device list that describes all the client devices located in the LAN that are not connected to any access point. The at least one supporting radio and the communication radio may have different ranges of operation. For example, the at least one supporting radio may be able to discover client devices that are beyond a range of the access point.

In another aspect, a network security appliance includes a communication radio to wirelessly imitate an access point of a LAN such that a client device is connected to a WAN through the communication radio that is wirelessly imitating the access point, and at least one supporting radio to inject at least one data packet into the client device to redirect traffic to the network security appliance. The injection of the at least one data packet is based on a command from an operator of the network security appliance and/or an automatic algorithm determined based on a set of preferences of the network security appliance.

In yet another aspect, a method of a network security appliance is disclosed. The method includes determining if an access point is available in a LAN through a sniffing algorithm of at least one supporting radio using a processor and a memory of the network security appliance. The method also determines if a client device is visible in the LAN using at least one supporting radio. At least one data packet is injected into the client device based on either (1) a command from an operator of the network security appliance and/or (2) an automatic algorithm determined based on a set of preferences of the network security appliance using at least one supporting radio. The method wirelessly imitates the access point of the LAN such that the client device is connected to a WAN through a communication radio that is wirelessly imitating the access point using the communication radio that is separate and distinct from at least one supporting radio (and thereby providing enhanced operational control over the network security appliance).

The methods and systems disclosed herein may be implemented in any means for achieving various aspects, and may be executed in a form of a non-transitory machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this disclosure are illustrated by way of example and not limitation in the figures of the accompanying drawings, in which like references indicate similar elements and in which:

FIG. 5 is a table view 550 of the network security appliance 100 of FIG. 1A, according to at least one embodiment.

Figure 1A:
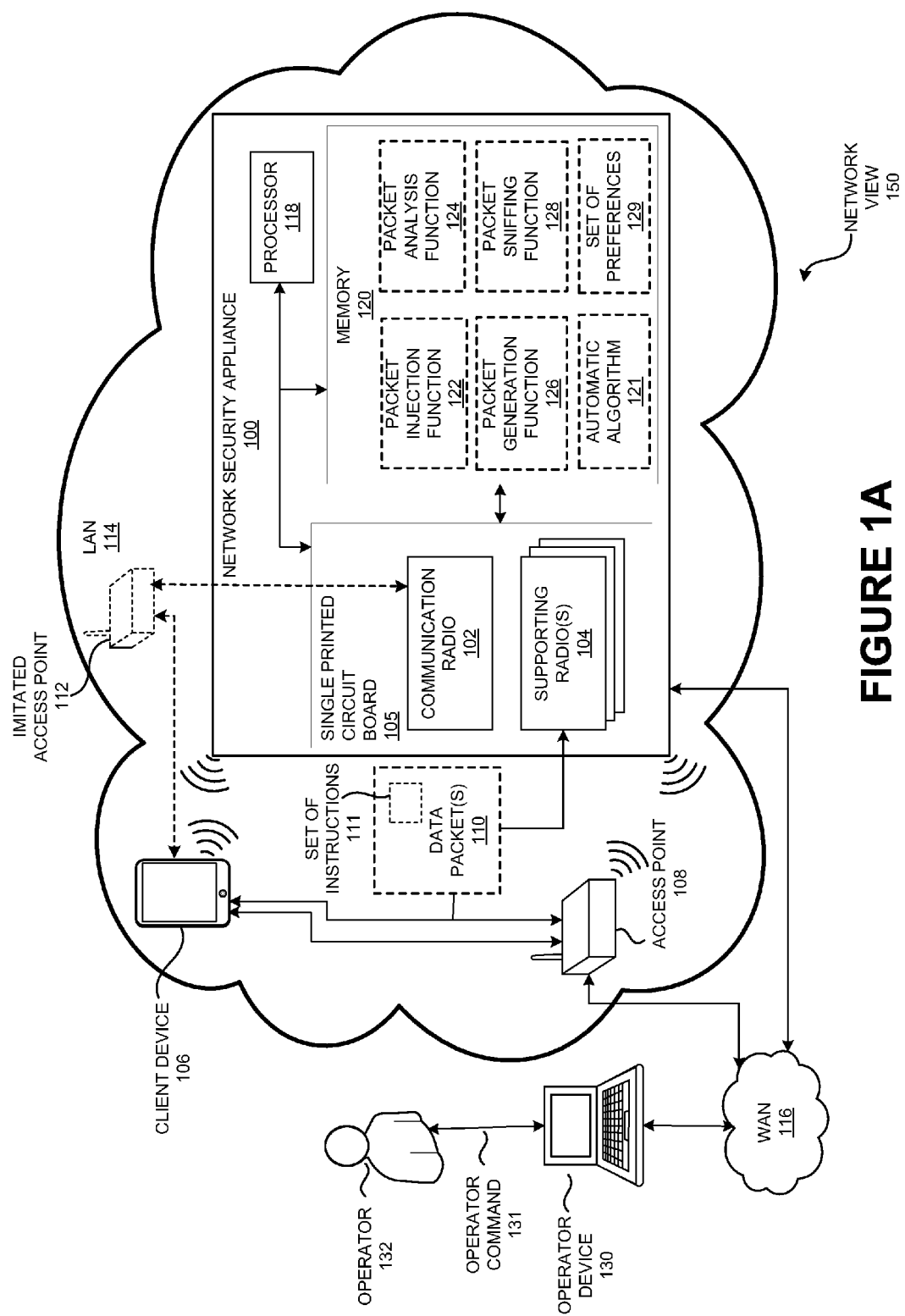
FIG. 1A is a network view 150 of a network security appliance 100 having a communication radio 102 and at least one supporting radio 104 imitating an access point 108 (e.g., through an imitated access point 112) in a Local Area Network (LAN) 114 to connect to a client device 106, according to at least one embodiment.

Other features of the present embodiments will be apparent from the accompanying drawings and from the detailed description that follows.

DETAILED DESCRIPTION

Example embodiments, as described below, may be used to provide a method and/or a system of a network security appliance to imitate a wireless access point of a Local Area Network (LAN) through coordination of multiple radios.

In one embodiment, a network security appliance 100 includes (1) supporting radio(s) 104 and (2) a communication radio 102. The supporting radio(s) 104 determines if an access point 108 is available in a Local Area Network (LAN) 114 through a sniffing algorithm (e.g., performed by a packet sniffing function 128), determines if a client device 106 is visible in the LAN 114, and injects at least one data packet 110 into the client device 106 based on either a command 131 from an operator 132 of the network security appliance 100 and/or an automatic algorithm 121 determined based on a set of preferences 129 of the network security appliance 100. The communication radio 102 wirelessly imitates the access point 108 (e.g., through the imitated access point 112 of FIG. 1) of the LAN 114 such that the client device 106 is connected to a Wide Area Network (WAN) 116 through the communication radio 102 that is wirelessly imitating the access point 108.

The communication radio 102 may wirelessly imitate a different access point 201 that was previously communicatively coupled with the client device 106 (e.g., by accessing a connection history 200 of the client device 106 through the supporting radio(s) 104 through the injection of at least one data packet 110). The at least one data packet 110 may automatically disconnect the client device 106 from the access point 108 when the client device 106 is connected to the access point 108. The at least one data packet 110 may include a set of instructions 111 that execute on the client device 106 in a manner such that the client device 106 automatically requests a connection to the communication radio 102 when the set of instructions 111 execute on the client device 106. The at least one data packet 110 may convey to the client device 106 that the communication radio 102 is the access point 108.

The WAN 116 may be an Internet network, a secure private network, and/or a distributed network. The supporting radio(s) 104 and/or the communication radio 102 may be on a single printed circuit board 105 forming the network security appliance 100. The communication radio 102 may be a rogue access point (e.g., through the imitated access point 112 of FIG. 1) to operate as a wireless access point 108 installed on a secure company network without explicit authorization from an administrator of the LAN 114. The rogue access point formed by the communication radio 102 may optionally permit the operator 132 of the network security appliance 100 to conduct a man-in-the-middle attack 160. The supporting radio(s) 104 may perform a function such as a packet injection function 122, a packet analysis function 124, a packet generation function 126, and/or a packet sniffing function 128. The client device may be specifically targeted (e.g., the targeted client device 300 of FIG. 3) by the network security appliance 100 based on a unique identifier 301 associated with the targeted client device 300. The network security appliance 100 may inject a series of packets 302 to ensure that the client device that is specifically targeted 300 trusts that the communication radio 102 is the access point 108.

The network security appliance 100 may transmit to the operator any one of the following: (1) an list of access points 404 that describes all the access points (e.g., similar to the access point 108) available in the LAN 114, (2) a connected client device list 406 that describes all the client devices 406 connected to the access points (e.g., similar to the access point 108) in the list of access points 404 in the LAN 114, and/or (3) an unconnected client device list 408 that describes all the client devices (e.g., the client device 106) located in the LAN 114 that are not connected to any access point 108. The supporting radio(s) 104 and the communication radio 102 may have different ranges of operation (e.g., the range of the supporting radio(s) 402 and the range of the communication radio 400 in FIG. 4). For example, the supporting radio(s) 104 may be able to discover client devices (e.g., the client device 106) that are beyond a range of the access point 108.

In another embodiment, a network security appliance 100 includes a communication radio 102 to wirelessly imitate an access point 108 of a LAN 114 (e.g., through the imitated access point 112 of FIG. 1) such that a client device 106 is connected to a WAN 116 through the communication radio 102 that is wirelessly imitating the access point 108, and supporting radio(s) 104 to inject at least one data packet 110 into the client device 106 to redirect traffic to the network security appliance 100. The injection of the at least one data packet 110 is based on a command 131 from an operator 132 of the network security appliance 100 and/or an automatic algorithm 121 determined based on a set of preferences 129 of the network security appliance 100.

In yet another embodiment, a method of a network security appliance 100 is disclosed. The method includes determining if an access point 108 is available in a LAN 114 through a sniffing algorithm (e.g., performed by a packet sniffing function 128) of supporting radio(s) 104 using a processor 118 and a memory 120 of the network security appliance 100. The method also determines if a client device 106 is visible in the LAN 114 using the supporting radio(s) 104. At least one data packet 110 is injected into the client device 106 based on either (1) a command 131 from an operator 132 of the network security appliance 100 and/or (2) an automatic algorithm 121 determined based on a set of preferences 129 of the network security appliance 100 using the supporting radio(s) 104. The method wirelessly imitates the access point 108 of the LAN 114 (e.g., through the imitated access point 112 of FIG. 1) such that the client device 106 is connected to a WAN 116 through a communication radio 102 that is wirelessly imitating the access point 108 using the communication radio 102 that is separate and distinct from the supporting radio(s) 104 (and thereby providing enhanced operational control over the network security appliance 100).

FIG. 1A is a network view 150 of a network security appliance 100 having a communication radio 102 and at least one supporting radio 104 imitating an access point 108 in a LAN 114 to connect to a client device 106, according to at least one embodiment. Particularly, FIG. 1A illustrates a network security appliance 100, a single printed circuit board 105 (e.g., having a communication radio 102, and a supporting radio(s) 104), client device 106, an access point 108, data packet(s) 110, a set of instructions 111, an imitated access point 112, a LAN 114, Wide Area Network (WAN) 116, a processor 118, a memory 120 (having an automatic algorithm 121, a packet injection function 122, a packet analysis function 124, a packet generation function 126, a packet sniffing function 128, and a set of preferences 129), an operator device 130, an operator command 131, and an operator 132.

The network security appliance 100 may be a server appliance (e.g., an active device, a passive device, a preventative device) designed to protect computer networks from unwanted traffic. For example, according to one embodiment, the network security appliance 100 may detect and report on intrusion by third party software and/or hardware into the LAN 114. According to one embodiment, the network security appliance 100 may contain separate radios, one which acts as an imitated access point 112 (e.g., the communication radio 102), and one or more other radio(s) which transmit and/or monitor data packets (e.g., the supporting radio(s) 104.) In another embodiment, at least one physical radio (e.g., the communication radio 102 and/or the supporting radio(s) 104) may operate as multiple virtual radios, which may function as multiple logical radios while utilizing the hardware of a single physical radio.

The communication radio 102 may be a Wi-Fi system on a chip (SoC) containing digital, analog, mixed-signal, and/or radio-frequency functions all on a single chip substrate. For example, according to one embodiment, the communication radio 102 may be a SoC for wireless LAN access point platforms and/or router platforms used to bring Wi-Fi connectivity to an embedded design. Further, according to another embodiment, the network security appliance 100 may have more than one of the communication radios 102, with a number equaling the number of radio channels permitted under the IEEE 802.11 specification. Under current 802.11 standards, there may be 14 available channels, which would allow for 14 separate communication radios (e.g., the communication radio 102). Additional communication radios (e.g., the communication radio 102) may enable more robust imitated access points and help to minimize potential bandwidth overload.

The at least one supporting radio(s) 104 may be a medium of wireless communication and may be a radio transmitter, receiver radio and/or a two way radio (e.g., a radio with monitor and/or injection capabilities). For example, according to one embodiment, the at least one supporting radio(s) 104 may be a wireless LAN USB 2.0 network interface controller supporting both transmission and receipt of data packet(s) 110. Further, according to another embodiment, there may be twice as many supporting radios (e.g., the supporting radio 104) as there are available channels under the IEEE 802.11 specification, where one of the supporting radio 104 per channel would be dedicated to a packet sniffing function 128 while the other supporting radio per channel would be dedicated to a packet injection function 122. For example, there may be 14 channels, which may allow for 28 separate supporting radios 104.

The single printed circuit board 105 may be one or more layers of etched copper sheets laminated onto a non-conductive substrate (e.g., single sided consisting of one copper layer, double sided consisting of two copper layers, or multilayer consisting of inner and outer layers.) For example, according to one embodiment, the single printed circuit board 105 may mechanically support and/or electrically connect the communication radio 102, the supporting radio(s) 104, and other electronic components using conductive tracks, pads and/or other features.

The client device 106 may be a piece of computer hardware and/or software that accesses a service made available by a server (e.g., a PC card, a mini-PC module, and/or a mobile computing device.) For example, according to one embodiment, the client device 106 may wirelessly communicate with the access point 108 and/or the network security appliance 100 (via the imitated access point 112) in order to connect to the WAN 116.

The access point 108 may be a device that wirelessly connects the client device 106 to a wired network (e.g., using Wi-Fi). For example, according to one embodiment, the access point 108 may connect to a router via the wired network as a standalone device and/or as an integral component of the router itself. Further, according to another embodiment, the access point 108 may support the connection of multiple wireless devices to one wired connection.

The data packet(s) 110 may be a formatted unit of data communication (e.g., control information and/or a payload), routed between an origin and a destination, and carried over a packet-switched network (e.g., the Internet.) For example, in one embodiment, the data packets 110 may provide data needed by the network to deliver the user data (e.g., the source IP address, the destination IP address, the sequence number of the packets, the type of service, and/or flags.) Additionally, in another embodiment, the control information may be found in packet headers and trailers, with user data in between. In yet another example embodiment, the data packet(s) 110 may function to coordinate forming and re-forming memberships (e.g., via management and control data packet(s) 110.) Further, in another embodiment, data may be transmitted as a bit stream rather than as data packet(s) 110.

The set of instructions 111 may be a component of the data packet(s) 110 and may convey disassociation, association, and/or reassociation instructions to a device. For example, in one embodiment, a disassociation set of instructions 111 may be declared by either the access point 108 and/or the client device 106. In a further embodiment, association and/or reassociation set(s) of instructions 111 may be handled by request and/or response management data packets 110.

The imitated access point 112 may be an access point 108 that mimics a primary access point 108 (e.g., a rogue access point.) For example, in one embodiment, the imitated access point 112 may be installed on a secure company network without explicit authorization from a local network administrator. In a further embodiment, the imitated access point 112 may be created to facilitate the man-in-the-middle attack by convincing the client device 106 that it is connected to the legitimate access point 108 when in fact it is connected to the imitated access point 112. In yet another embodiment, the imitated access point 112 may be a logical entity that resides within a physical access point 108 (e.g., a virtual access point.)

The Local Area Network (LAN) 114 may be a computer network that links a server to a group of computers and/or associated devices in a limited area (e.g., within a building or group of adjacent buildings) using network media (e.g., a shared communications line and/or a wireless link.) For example, in one embodiment, the LAN 114 may be based on wireless technologies and/or traditional cabling (e.g., coaxial cabling, shielded twisted pair cabling, unshielded twisted pair cabling, structured cabling, and/or fiber optics cabling.)

The Wide Area Network (WAN) 116 may be a computer network that links a group of computers and/or associated devices across a broad area (e.g., across metropolitan, regional, national, and/or international boundaries) using lead telecommunication lines. For example, according to one embodiment the WAN 116 may be the Internet. According to yet another embodiment, the WAN 116 may connect the computers and associated devices through public networks (e.g., the telephone system), leased lines and/or satellites.

The processor 118 may be the logic circuitry that responds to and processes the basic programs and/or instructions that drive a computer (e.g., a central processing unit, a microprocessor, and/or a multi-core processor.) For example, according to one embodiment, the processor 118 may be a MIPS processor.

The memory 120 may be a device used to store information for use in a computer and/or associated devices (e.g., HDD, SSD, RAM and/or ROM). For example, according to one embodiment, the memory 120 may be used to store the automatic algorithm 121, the packet injection function 122, the packet analysis function 124, the packet generation function 126, the packet sniffing function 128, and/or the set of preferences 129 of the network security appliance 100.

The automatic algorithm 121 may be a self-contained set of operations to be performed within a finite amount of space and time. For example, according to one embodiment, the automatic algorithm 121 may operate on the supporting radio(s) 104 in order to cause it to inject the data packet(s) 110 into the client device 106. Further, according to another embodiment, the automatic algorithm 121 may instruct the supporting radio(s) 104 to inject the data packet(s) 110 into the access point 108.

A packet injection function 122 may be a process of interfering with an established network connection, by means of constructing data packet(s) 110 to appear as if they are part of the normal communication stream. For example, according to one embodiment, the packet injection function 122 may insert the data packet(s) 110 into an existing communication stream between the client device 106 and the access point 108 in order to cause them to disassociate. Further, according to another embodiment, the packet injection function 122 may insert the data packet(s) 110 in order to cause the client device 106 to associate with the network security appliance 100 through the imitated access point 112 of the communication radio 102.

A packet analysis function 124 may decode the raw data of a captured data packet 110 and/or show the values of various fields in the data packet(s) 110 (e.g., analyze the content of the data packet(s) 110 according to certain specifications.) For example, according to one embodiment, the packet analysis function 124 may decode a captured data packet 110 in order to access a connection history 200 of the client device 106.

The packet generation function 126 may construct random data packet(s) 110 and/or allow the operator 132 of the network security appliance 100 to construct detailed custom data packet(s) 110. For example, according to one embodiment, the packet generation function 126 may construct the data packet(s) 110 injected by the supporting radio(s) 104 (e.g., for the purpose of causing the client device 106 and the access point 108 to disassociate and/or causing the client device 106 to associate with the network security appliance 100.)

The packet sniffing function 128 may intercept and log traffic that passes over a digital network and/or part of a network. For example, according to at least one embodiment, the packet sniffing function 128 may capture data packet(s) 110 that may then be analyzed via the packet injection function 122.

The set of preferences 129 may be a set of parameters and/or goals to be met and/or achieved by the network security appliance 100. The operator device 130 may be a piece of equipment used by the operator 132 of the network security appliance 100 for the purpose of communicating with the network security appliance 100. For example, according to one embodiment, the operator device 130 may be a mobile device (e.g., a laptop, a cell phone, and/or a tablet.)

The operator command 131 may be an order which instructs the network security appliance to carry out at least one function (e.g., the packet injection function 122, the packet analysis function 124, the packet generation function 126, and/or the packet sniffing function 128.) For example, according to at least one embodiment, the operator command 131 may instruct the supporting radio(s) 104 to inject the data packet(s) 110 into the client device 106. An operator 132 may be a person, device, process, and/or system that controls the functioning of the network security appliance 100.

In FIG. 1A, the operator 132 may communicate through the operator device 130 (e.g., by communicating an operator command 131.) The operator device 130 may communicate with the network security appliance 100 through the WAN 116. The WAN 116 may be connected to an access point and/or the network security appliance 100. The access point 108 may be communicatively coupled with the client device 106 (e.g., wirelessly and/or in a wired form) and the network security appliance 100 through the supporting radio(s) 104. The network security appliance 100, the client device 106, and the access point 108 are illustrated located in the LAN 114, according to one embodiment. The network security appliance 100 may have a single printed circuit board 105 that may include the communication radio 102 and the supporting radio(s) 104. The network security appliance 100 may also have a processor 118 and a memory 120 that are communicatively coupled with the single printed circuit board 105 having the communication radio 102 and the supporting radio(s) 104. The memory 120 may include an automatic algorithm 121, a packet injection function 122, a packet analysis function 124, a packet generation function 126, a packet sniffing function 128, and/or a set of preferences 129. The communication radio 102 may operate as an imitated access point 112 in the LAN 114. The client device 106 may be communicatively coupled to the network security appliance 100 through the imitated access point 112 of the communication radio 102. The supporting radio(s) 104 may communicate data packet(s) 110 that may include a set of instructions 111 to the client device 106 and/or to the access point 108. The client device 106 and/or the access point 108 may also communicate data packet(s) 110 that may include a set of instructions 111 to the network security appliance 100 through the supporting radio(s) 104.

In one embodiment, a network security appliance 100 includes (1) supporting radio(s) 104 and (2) a communication radio 102. The supporting radio(s) 104 determines if an access point 108 is available in a Local Area Network (LAN) 114 through a sniffing algorithm (performed by a packet sniffing function 128), determines if a client device 106 is visible in the LAN 114, and injects at least one data packet 110 into the client device 106 based on either a command 131 from an operator 132 of the network security appliance 100 and/or an automatic algorithm 121 determined based on a set of preferences 129 of the network security appliance 100. The communication radio 102 wirelessly imitates the access point 108 (e.g., through the imitated access point 112 of FIG. 1) of the LAN 114 such that the client device 106 is connected to a Wide Area Network (WAN) 116 through the communication radio 102 that is wirelessly imitating the access point 108.

The communication radio 102 may wirelessly imitate a different access point 201 that was previously communicatively coupled with the client device 106 (e.g., by accessing a connection history 200 of the client device 106 through the supporting radio(s) 104 through the injection of at least one data packet 110). The at least one data packet 110 may automatically disconnect the client device 106 from the access point 108 when the client device 106 is connected to the access point 108. The at least one data packet 110 may include a set of instructions 111 that execute on the client device 106 in a manner such that the client device 106 automatically requests a connection to the communication radio 102 when the set of instructions 111 execute on the client device 106. The at least one data packet 110 may convey to the client device 106 that the communication radio 102 is the access point 108.

The WAN 116 may be an Internet network, a secure private network, and/or a distributed network. The supporting radio(s) 104 and/or the communication radio 102 may be on a single printed circuit board 105 forming the network security appliance 100. The communication radio 102 may be a rogue access point (e.g., through the imitated access point 112 of FIG. 1) to operate as a wireless access point 108 installed on a secure company network without explicit authorization from an administrator of the LAN 114. The rogue access point formed by the communication radio 102 may optionally permit the operator 132 of the network security appliance 100 to conduct a man-in-the-middle attack 160. The supporting radio(s) 104 may perform a function such as a packet injection function 122, a packet analysis function 124, a packet generation function 126, and/or a packet sniffing function 128. The client device may be specifically targeted (e.g., the targeted client device 300 of FIG. 3) by the network security appliance 100 based on a unique identifier 301 associated with the targeted client device 300. The network security appliance 100 may inject a series of packets 302 to ensure that the client device that is specifically targeted 300 trusts that the communication radio 102 is the access point 108.

In another embodiment, a network security appliance 100 includes a communication radio 102 to wirelessly imitate an access point 108 of a LAN 114 (e.g., through the imitated access point 112 of FIG. 1) such that a client device 106 is connected to a WAN 116 through the communication radio 102 that is wirelessly imitating the access point 108, and supporting radio(s) 104 to inject at least one data packet 110 into the client device 106 to redirect traffic to the network security appliance 100. The injection of the at least one data packet 110 is based on a command 131 from an operator 132 of the network security appliance 100 and/or an automatic algorithm 121 determined based on a set of preferences 129 of the network security appliance 100.

In yet another embodiment, a method of a network security appliance 100 is disclosed. The method includes determining if an access point 108 is available in a LAN 114 through a sniffing algorithm (performed by a packet sniffing function 128) of supporting radio(s) 104 using a processor 118 and a memory 120 of the network security appliance 100. The method also determines if a client device 106 is visible in the LAN 114 using the supporting radio(s) 104. At least one data packet 110 is injected into the client device 106 based on either (1) a command 131 from an operator 132 of the network security appliance 100 and/or (2) an automatic algorithm 121 determined based on a set of preferences 129 of the network security appliance 100 using the supporting radio(s) 104. The method wirelessly imitates the access point 108 of the LAN 114 (e.g., through the imitated access point 112 of FIG. 1) such that the client device 106 is connected to a WAN 116 through a communication radio 102 that is wirelessly imitating the access point 108 using the communication radio 102 that is separate and distinct from the supporting radio(s) 104 (and thereby providing enhanced operational control over the network security appliance 100).

Figure 1B:
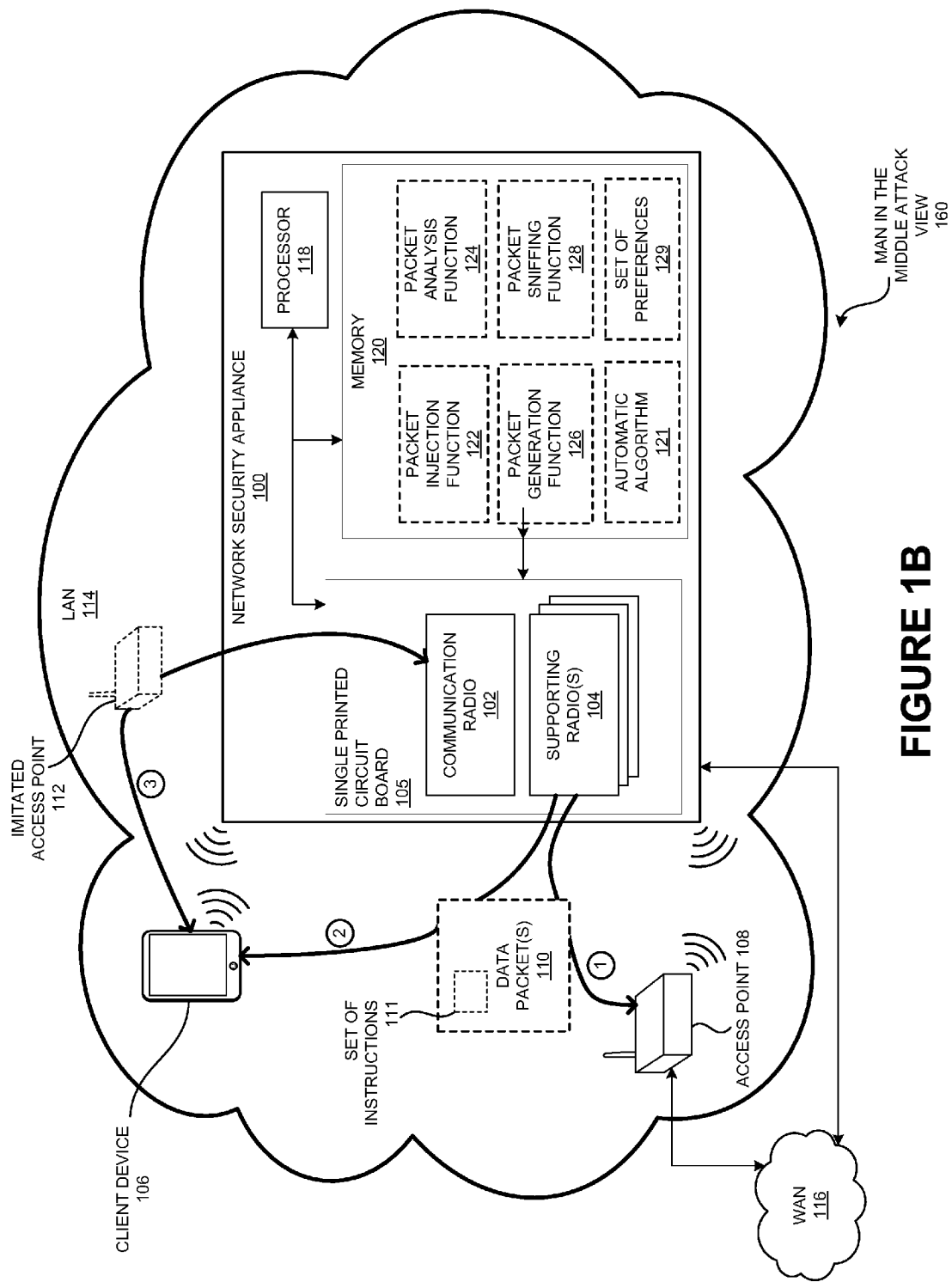
FIG. 1B is a man in the middle attack view 160 of the network security appliance 100 altering the communication between the access point 108 and client device 106 of FIG. 1A, according to at least one embodiment.

FIG. 1B is a man-in-the-middle attack 160 view of the network security appliance 100 altering the communication between the access point 108 and client device 106 of FIG. 1A, according to at least one embodiment. Particularly, FIG. 1B illustrates a the man-in-the-middle attack 160 view through circle '1', circle '2', and circle '3'.

A man in the middle attack may occur when the operator of the network security appliance secretly relays and alters the communication between the client device and the access point while they believe they are directly communicating with each other. For example, according to one embodiment, as portrayed by circle '1' of FIG. 1B, the supporting radio(s) 104 may inject the data packet(s) 110 into the access point 108 pretending to be from the client device 106 and requesting to disconnect.

Further, as portrayed by circle '2' of FIG. 1B, the supporting radio(s) 104 may then immediately after and/or simultaneously inject the data packet(s) 110 into the client device 106 pretending to be from the access point 108 and requesting to disconnect. These actions may cause the access point and the client device to disassociate from one another. Moreover, as additionally portrayed by circle '2', the supporting radio(s) 104 may then send the data packet(s) 110 to the client device 106 indicating that the imitated access point 112 of the communication radio 102 is actually the legitimate access point 108 and request the client device 106 to connect to it.

Additionally, as portrayed by circle '3' in FIG. 1B, client device 106 may immediately thereafter connect to the network security appliance 100 through the imitated access point 112 of the communication radio 102.

FIG. 1B, portrays the similar features as FIG. 1A with the additional elements of the events portrayed by circle '1', circle '2', and circle '3'. Circle '1' portrays the supporting radio(s) 104 acting on the access point 108 by injecting the data packet(s) 110 into the access point 108 instructing the access point 108 to disconnect from the client device 106. Circle '2' portrays the supporting radio(s) 104 acting on the client device 106 by injecting the data packet(s) 110 into the client device 106 instructing the client device 106 to disconnect from the access point 108 and connect to the network security appliance 100 through the imitated access point 112 of the communication radio 102. Circle '3' portrays the client device 106 connecting to the network security appliance 100 through the imitated access point 112 of the communication radio 102.

Figure 2:
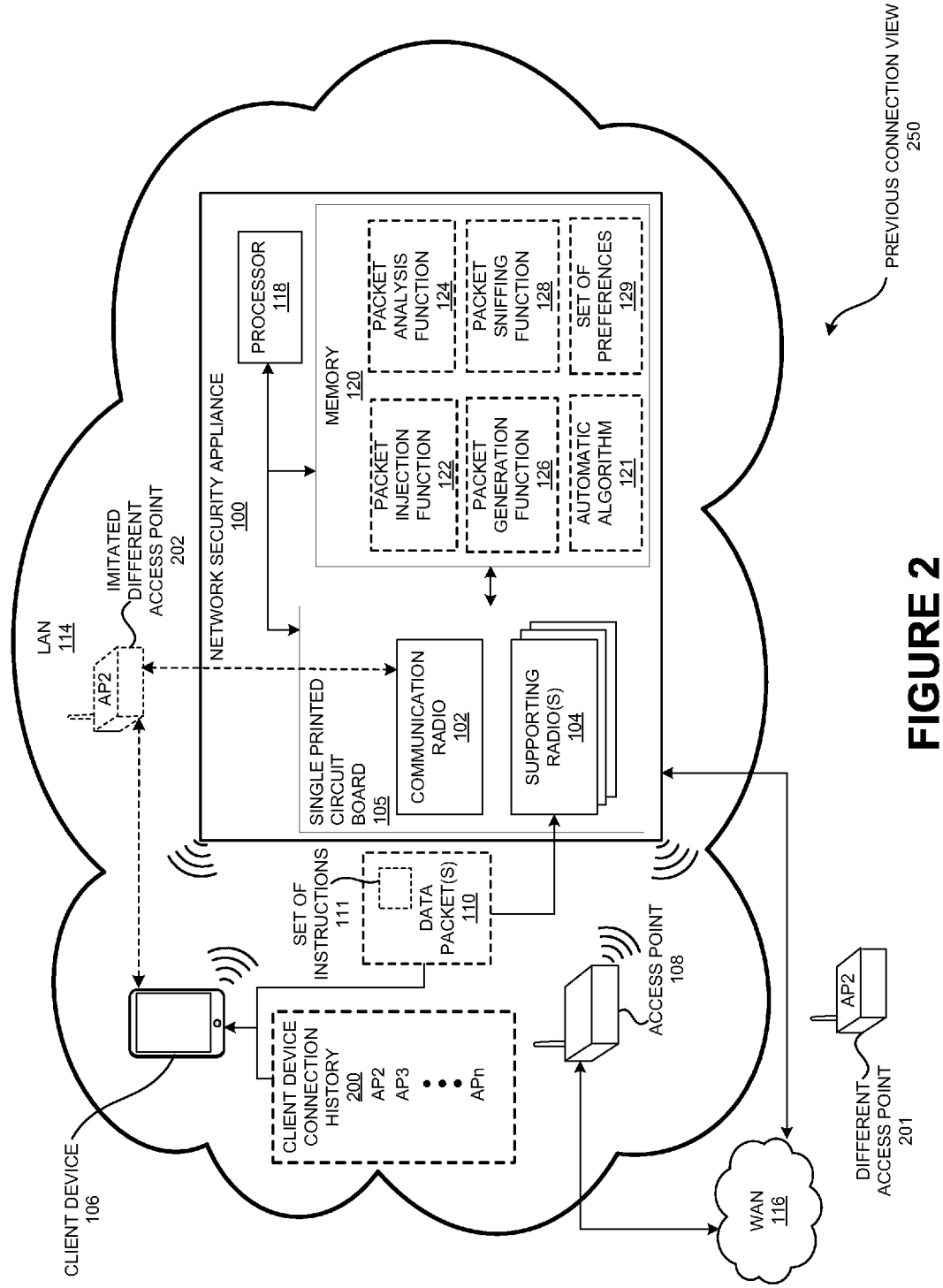
FIG. 2 is a previous connection view 250 of the client device 106 of FIG. 1A, according to at least one embodiment.

FIG. 2 is a previous connection view 250 of the client device 106 of FIG. 1A, according to at least one embodiment. Particularly, in FIG. 2, are illustrated a connection history 200 of the client device 106, a different access point 201, and an imitated different access point 202.

The client device connection history 200 may be a list of access points (e.g., similar to the access point 108) that the client device has previously associated with on other occasions (e.g., a day, week, month, etc. prior). For example, according to one embodiment, the client device connection history 200 may inform the operator 132 of the network security appliance 100 that the client device 106 was previously connected to the different access point 201.

The imitated different access point 202 may be an access point 108 that the client device 106 is not currently communicatively coupled with but that the client device 106 was previously communicatively coupled with. The different access point 201 may be a device that wirelessly connects the client device 106 to a wired network (e.g., using Wi-Fi). For example, according to one embodiment, the imitated different access point 202 may connect to a router via a wired network as a standalone device and/or as an integral component of the router itself. Further, according to another embodiment, the imitated different access point 202 may support the connection of multiple wireless devices to one wired connection. Moreover, according to an additional embodiment, the different access point 201 may be an access point 108 that is included in the client device connection history 200.

The imitated different access point 202 may be an access point 108 that mimics a primary access point 108 (e.g., a rogue access point) that was previously communicatively coupled to the client device 106. For example, in one embodiment, the imitated different access point 202 may be installed on a secure company network without explicit authorization from a local network administrator. In a further embodiment, the imitated different access point 202 may be created to facilitate the man-in-the-middle attack by convincing the client device 106 that it is connected to the legitimate access point 108 when in fact it is connected to the imitated different access point 202. In yet another embodiment, the different imitated access point 202 may be a logical entity that resides within a physical access point (e.g., a virtual access point.)

In FIG. 2, the network view of FIG. 1A is illustrated with the following additional elements and differences. In FIG. 2, the client device may not be currently communicatively coupled to the access point. The client device 106 may communicate a client device connection history 200 associated with that client device 106 to the network security appliance 100 by communicating data packet(s) 110 to the supporting radio(s) 104. The client device connection history 200 may identify access points that the client device was previously connected to, including the different access point 201. The different access point 201 may not be part of the LAN 114. In FIG. 2, the communication radio may operate as the imitated different access point 202, rather than as the imitated access point 112 of FIG. 1A. Further, in FIG. 2, the client device 106 may be communicatively coupled to the network security appliance 100 through the imitated different access point 202 of the communication radio, rather than through the imitated access point 112 of FIG. 1A.

Figure 3:
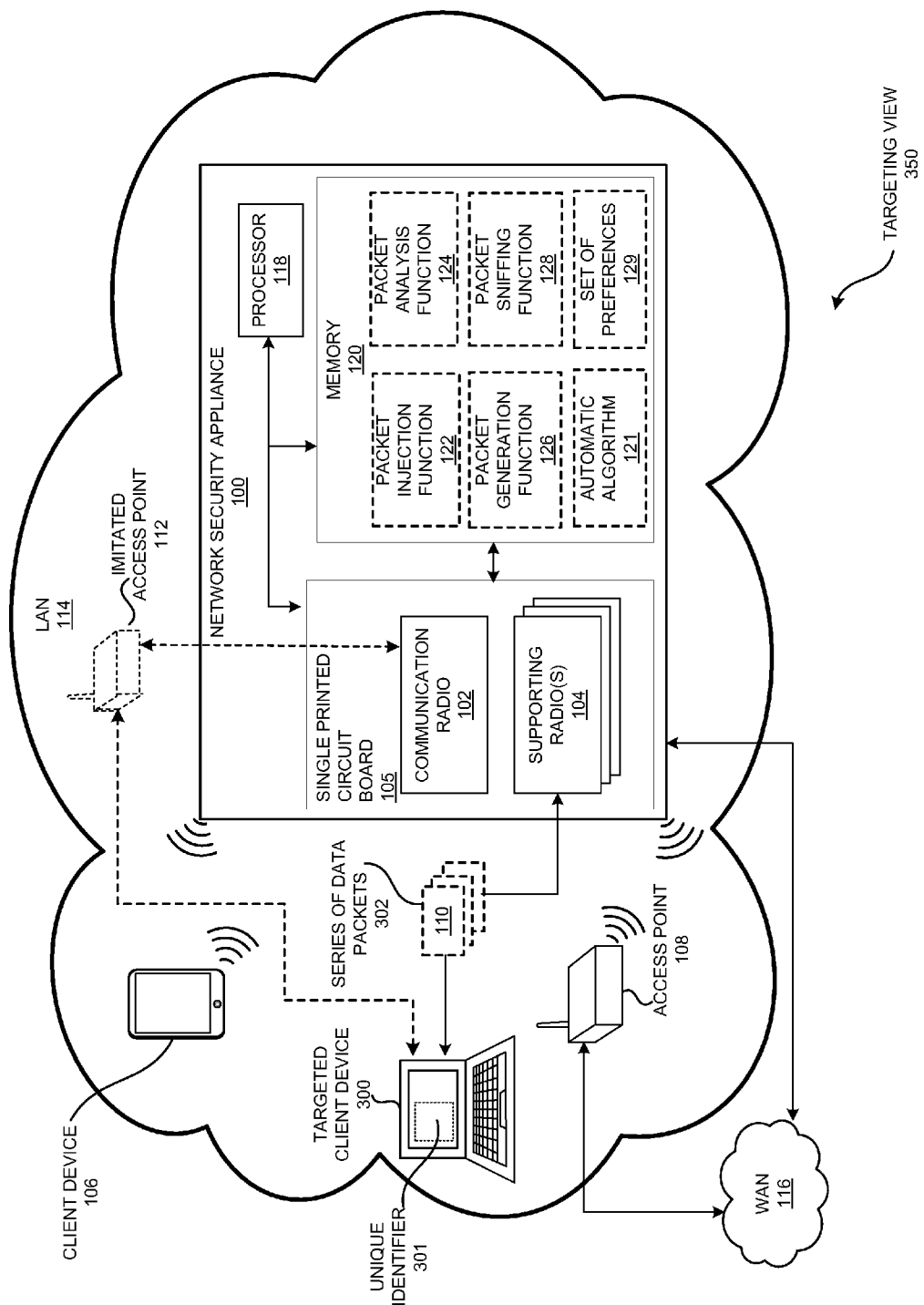
FIG. 3 is a targeting view 350 of the network security appliance 100 of FIG. 1A specifically directing a series of data packet(s) 302 to a targeted client device 300, according to at least one embodiment.

FIG. 3 is a targeting view 350 of the network security appliance 100 of FIG. 1A specifically directing a series of data packet(s) 302 to a targeted client device 300, according to at least one embodiment. Particularly, in FIG. 3, are illustrated a targeted client device 300, a unique identifier 301, and a series of data packets 302. The targeted client device 300 may be a specific client device that is singled out by the network security appliance 100 to be the subject of specific actions carried out by the network security appliance 100.

The targeted client device 300 may be a piece of computer hardware and/or software that accesses a service made available by a server (e.g., a PC card, a mini-PC module, and/or a mobile computing device.) For example, according to one embodiment, the targeted client device 300 may be questioning the authenticity of the imitated access point 112 which may cause the network security appliance 100 to inject a series of data packets 302 into the targeted client device 300 via the supporting radio(s) 104 in order to reinforce the purported legitimacy of the imitated access point 112. Further, according to another embodiment, the targeted client device 300 may wirelessly communicate with the access point 108 and/or the network security appliance 100 (via the imitated access point 112 of the communication radio 102) in order to connect to the WAN 116.

The unique identifier 301 may be a feature associated with the targeted client device 300 that allows the targeted client device 300 to be differentiated from other client devices (e.g., the client device 106) when communicating with a wireless network. For example, according to one embodiment, the unique identifier 301 may be an SSID. According to another embodiment, the unique identifier 301 may be a Mac address.

The series of data packets 302 may be a short round burst of beacons (e.g., data packet(s) 110) sent out by the supporting radio(s) 104 to the targeted client device 300. The series of data packets 302 may be formatted units of data communication (e.g., control information and/or a payload), routed between an origin and a destination, and carried over a packet-switched network (e.g., the Internet.) For example, in one embodiment, the series of data packets 110 may provide data needed by the network to deliver the user data (e.g., the source IP address, the destination IP address, the sequence number of the packets, the type of service, and/or flags.) Additionally, in another embodiment, the control information may be found in packet headers and trailers, with user data in between. In yet another example embodiment, the series of data packets 302 may function to coordinate forming and re-forming memberships (e.g., via management and control data packet(s) 110.) Further, in another embodiment, data may be transmitted as a bit stream rather than as data packet(s) 110. According to a further embodiment, the series of data packets 302 may be injected into the targeted client device 300 in order to reinforce the purported legitimacy of the imitated access point 112.

In FIG. 3, the network view of FIG. 1A is shown with the following additional elements and differences. The operator 132, operator command 131, and operator device 130 may not be shown in FIG. 3, although the presence of these elements remains implicit. Further, in FIG. 3, the client device 106 may not be communicatively coupled to the network security appliance 100 and/or to the access point 108. Instead, the targeted client device 300 may be the focus of a man-in-the-middle attack through the network security appliance 100. Further, the supporting radio(s) 104 may not be communicating data packets 110 to the access point 108 and/or the client device 106. In FIG. 3, the targeted client device 300 may be located in the LAN 114. The targeted client device 300 may contain a unique identifier 301. In FIG. 3, the supporting radio(s) may communicate a series of data packets 302 to the targeted client device 300. Further, the targeted client device 300 may be communicatively coupled to the network security appliance 100 through the imitated access point 112 of the communication radio 102.

Figure 4:
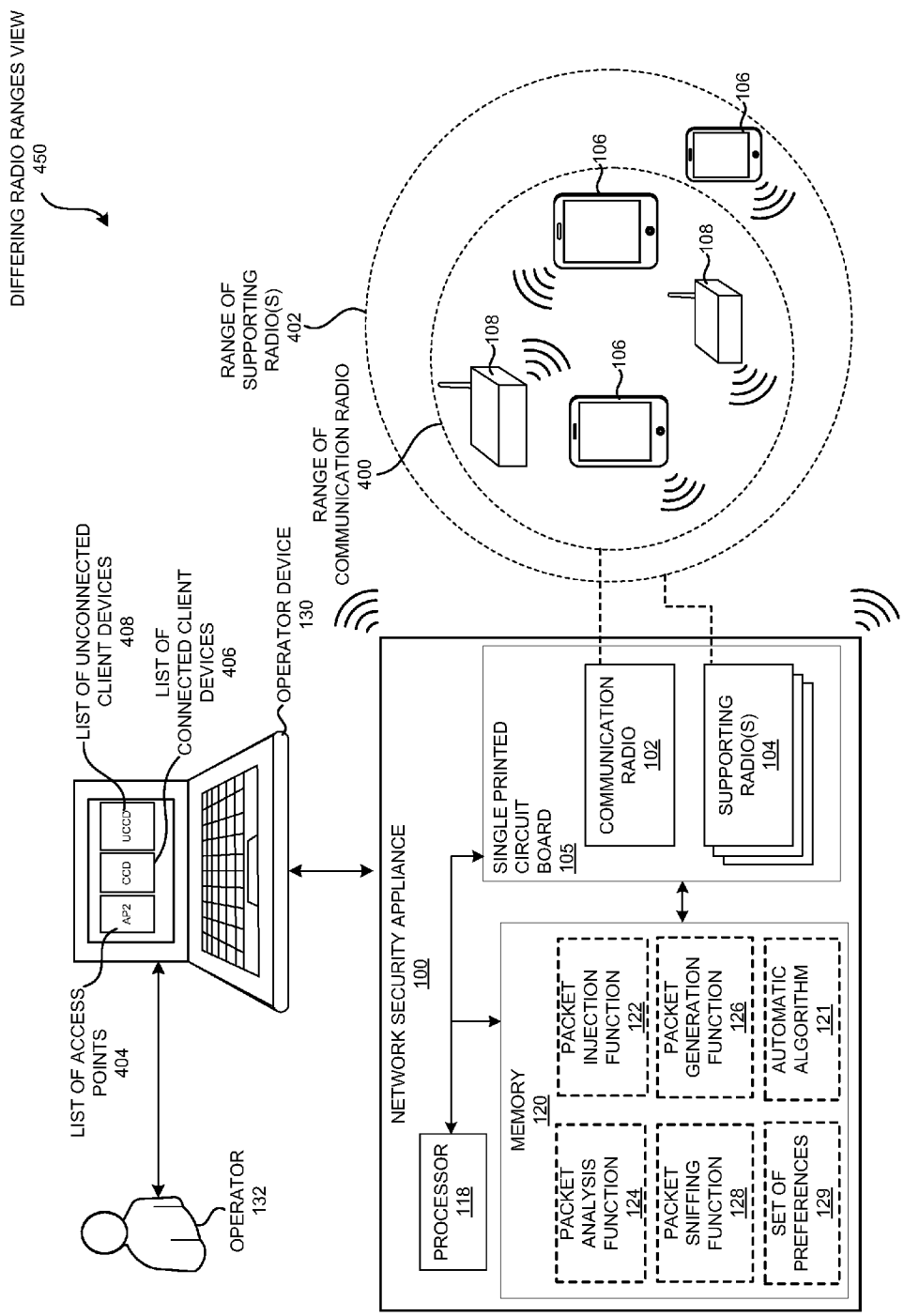
FIG. 4 is a differing radio ranges view 450 of the communication radio 102 and the at least one supporting radio 104 of the network security appliance 100 of FIG. 1A, according to at least one embodiment.

FIG. 4 is a differing radio ranges view 450 of the communication radio 102 and the at least one supporting radio 104 of the network security appliance 100 of FIG. 1A, according to at least one embodiment. Particularly, in FIG. 4, are illustrated a range of communication radio 400, a range of supporting radio(s) 402, a list of access points 404, an unconnected client device list 408, and a list of connected client devices 406.

The range of communication radio 400 may be the distance that the communication radio 102 can effectively communicate. For example, according to one embodiment, the range of communication radio 400 may have a smaller radius than that of the range of supporting radio(s) 402. The range of supporting radio(s) 402 may be the distance that the supporting radio(s) 104 can effectively communicate. For example, according to one embodiment the range of supporting radio(s) 402 may have a larger radius than that of the range of the communication radio 400. According to another embodiment, the network security appliance 100 may identify client devices (e.g., the client device 106) that are within the range of supporting radio(s) 402 but outside the range of communication radio 400. Although these client devices (e.g., the client device 106) are not within range of being able to connect to the imitated access point 112 of the communication radio 102, the operator 132 of the network security appliance 100 may then decide to take different actions, such as moving closer to the out of range client device that it wants to act on. The list of access points 404 may be a list of all the available access points (e.g., similar to the access point 108) in the LAN 114 and/or within the range of communication radio 400. The list of connected client devices 406 may be a list of all the client devices (e.g., the client device 106) in the LAN 114 and/or within the range of communication radio(s) 400 that are currently connected to an access point 108 contained in the list of access points 404.

The list of unconnected client devices 408 may be a list of all the client devices (e.g., the client device 106) in the LAN 114 and/or within the range of supporting radio(s) 402 that are not currently connected to an access point 108 contained in the list of access points 404.

The network security appliance 100 may transmit to the operator any one of the following: (1) an list of access points 404 that describes all the access points (e.g., similar to the access point 108) available in the LAN 114, (2) a connected client device list 406 that describes all the client devices 406 connected to the access points (e.g., similar to the access point 108) in the list of access points 404 in the LAN 114, and/or (3) an unconnected client device list 408 that describes all the client devices (e.g., the client device 106) located in the LAN 114 that are not connected to any access point 108.

The supporting radio(s) 104 and the communication radio 102 may have different ranges of operation (e.g., the range of the supporting radio(s) 402 and the range of the communication radio 400 in FIG. 4). For example, the supporting radio(s) 104 may be able to discover client devices (e.g., the client device 106) that are beyond a range of the access point 108.

In FIG. 4, the operator 132 may be communicatively coupled to the operator device 130. The operator device 130 may be communicatively coupled to the network security appliance 100. The communication radio 102 may detect client devices (e.g., the client device 106) and access points (e.g., similar to the access point 108) within the range of communication radio 400. The range of supporting radio(s) 402 may have a radius that is larger than the range of communication radio 400. Therefore, the supporting radio(s) 104 may detect additional client devices within the range of supporting radio(s) 402. The client devices (e.g., the client device 106) and the access points (e.g., similar to the access point 108) detected by the communication radio 102 and the supporting radio(s) 104 may be displayed on the operator device 130 as the list of access points 404, the list of connected client devices 406, and/or the list of unconnected client devices 408.

FIG. 5 is a table view 550 of the network security appliance 100 of FIG. 1A, according to at least one embodiment. Particularly, in FIG. 5, are illustrated more detailed examples of the list of access points 404, the list of connected client devices, and the list of unconnected client devices 408 of FIG. 4, as well as the client device connection history 200 of FIG. 2. Specifically, in FIG. 5, a Living Room Wi-Fi, a Bedroom Wi-Fi, and a Study Wi-Fi are illustrated as example embodiments of Available Access Points 504. Malcolm's Cell Phone, Malcolm's Computer, Kaylee's Tablet and Wash's TV are illustrated as example embodiments of Connected Client Devices 506 that may be associated with the Living Room Wi-Fi example embodiment of Available Access Points 504. Zoe's Printer and Zoe's Cell Phone are illustrated as example embodiments of Connected Client Devices 506 that may be associated with the Study Wi-Fi example embodiment of Available Access Points 504. In FIG. 5, Malcolm's Tablet, Inara's Phone, Inara's Computer, Jayne's Computer, River's Phone, and Simon's Phone are illustrated as example embodiments of Unconnected Client Devices 508. Client Device Connection History 200 is illustrated as associated with both the Connected Client Devices 506 and the Unconnected Client Devices 508, according to the embodiments illustrated in FIG. 5. The table view 550 may illustrate a table created by the network security appliance 100 of FIG. 1 when analyzing the LAN 114, according to one embodiment.

Figure 6:
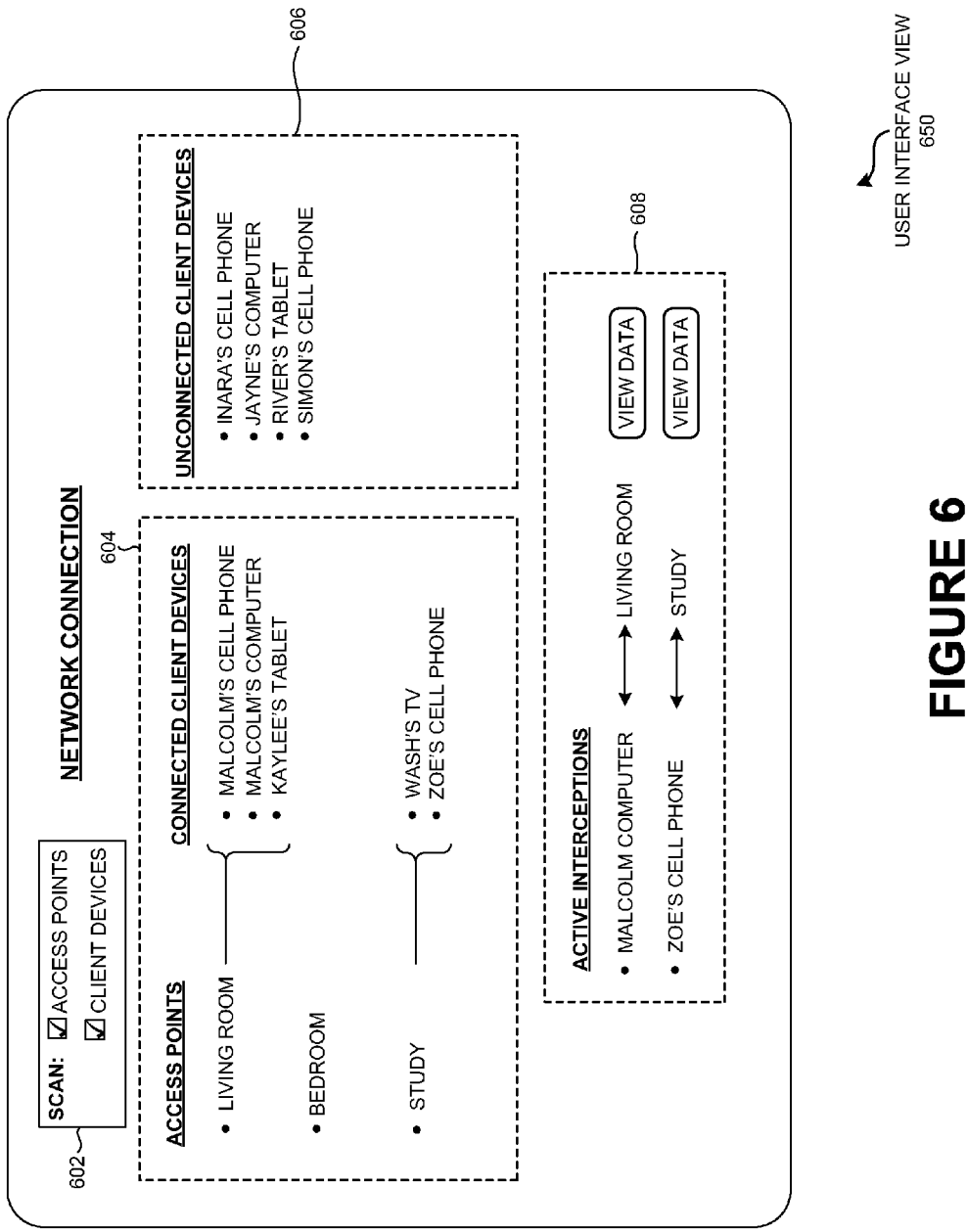
FIG. 6 is a user interface view 650 of the network security appliance 100 of FIG. 1A, according to at least one embodiment.

FIG. 6 is a user interface view 650 of the network security appliance 100 of FIG. 1A, according to at least one embodiment. Particularly, in FIG. 6, are illustrated Block 602, Block 604, Block 606 and Block 608. Block 602 may display an option for scanning for visible access points and/or visible client devices (e.g., the client device 106). Block 604 may display all access points (e.g., similar to the access point 108) visible to the network security appliance 100 (e.g., within the range of the communication radio 400) and/or all the client devices (e.g., the client device 106) that are connected to those access points (e.g., similar to the access point 108). In FIG. 6, Living Room, Bedroom, and Study are illustrated as example embodiments of visible access points displayed in Block 604. Malcolm's Cell Phone, Malcolm's Computer, and Kaylee's Tablet are illustrated as example embodiments of connected client devices associated with the Living Room access point displayed in Block 604. Wash's TV and Zoe's Cell Phone are illustrated as example embodiments of connected client devices associated with the Study access point displayed in Block 604.

Block 606 may display all client devices (e.g., the client device 106) visible to the network security appliance 100 (e.g., within the range of the communication radio 400 and/or within the range of the supporting radio(s) 402) that are not connected to any of the access points (e.g., similar to the access point 108) displayed in block 604. In FIG. 6, Inara's Cell Phone, Jayne's Computer, River's Tablet, and Simon's Cell Phone are illustrated as example embodiments of unconnected client devices displayed in Block 606.

Block 608 may display a list of all active interceptions being conducted by the network security appliance 100 and/or an option to view any data associated with a particular interception. In FIG. 6, a connection between Malcom's Computer and Living Room, and a connection between Zoe's Cell Phone and Study are illustrated as example embodiments of active interceptions displayed in Block 608.

Figure 7:
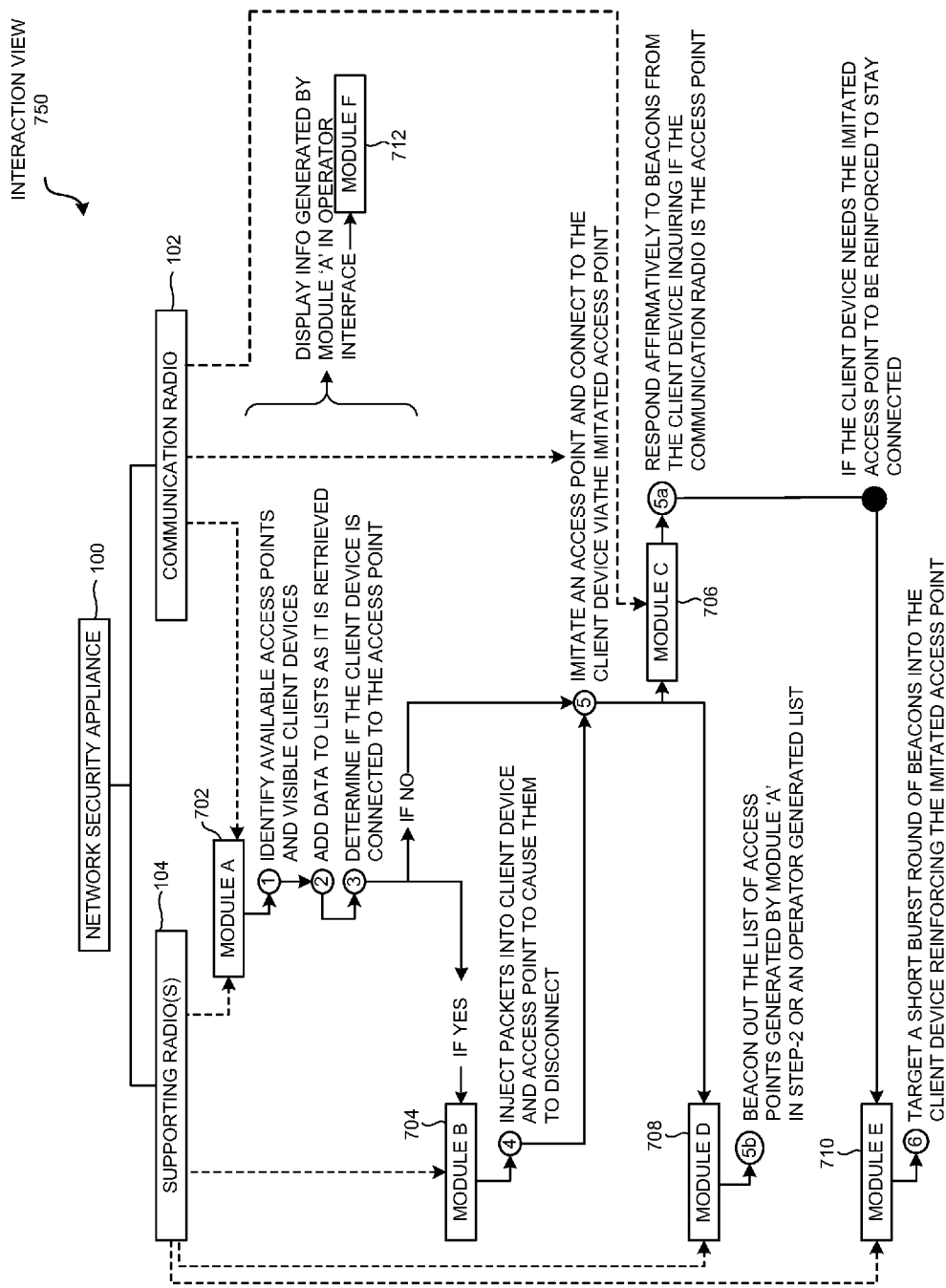
FIG. 7 is an interaction view 750 between the communication radio 102 and the at least one supporting radio 104 of the network security appliance 100 of FIG. 1A, according to at least one embodiment.

FIG. 7 is an interaction view 750 between the communication radio 102 and the at least one supporting radio 104 of the network security appliance 100 of FIG. 1A, according to at least one embodiment. Particularly, in FIG. 7, are illustrated a Module 'A' 702, a Module 'B' 704, a Module 'C' 706, a Module 'D' 708, a Module 'E' 710, and a Module 'F' 712.

Module 'A' 702, Module 'B' 704, Module 'C' 706, Module 'D' 708, Module 'E' 710, and Module 'F' 712 may be software and/or hardware circuitry contained in the network security appliance 100.

Module 'A' 702 that may identify available access points (e.g., similar to the access point 108) and visible client devices (e.g., the client device 106), as described by (1), add data to lists as the data is retrieved, as described by (2), and/or determining if the client device is connected to the access point, as described by (3).

Through Module 'B', if the client device is connected to the access point, then Module 'B' may inject data packet(s) 110 into the client device 106 and the access point 108 to cause them to disconnect, as described by (4). Once the client device 106 and access point 108 have disconnected or if the client device 106 is not connected to the access point 108, then the network security appliance 100 may imitate an access point 108 and connect to the client device 106 via the imitated access point 112 of the communication radio 102, as described in (5).

Next, through Module 'C', once the client device 106 has connected to the network security appliance 100, Module 'C' may respond affirmatively to beacons from the client device 106 inquiring if the communication radio 102 is the access point 108, as described in (5a), and/or Module 'D' may beacon out the list of access points 404 generated by Module 'A' in (2) and/or an operator 132 generated list, as described in (5b). If the client device 106 needs the imitated access point 1112 to be reinforced to stay connected, then Module 'E' may target a short burst round of beacons (e.g., the series of data packets 302) into the client device 106 reinforcing the imitated access point 112.

In FIG. 7, the network security appliance 100 may contain the communication radio 102 and the supporting radio(s) 104. Module 'B' 704, Module 'D' 708, and Module 'E,' 710 may be associated with the supporting radio(s) 104. Module 'C' 706 may be associated with the communication radio 102. Module 'A' may be associated with both the communication radio 102 and the supporting radio(s) and may generate information to be displayed by Module 'F'.

Figure 8:
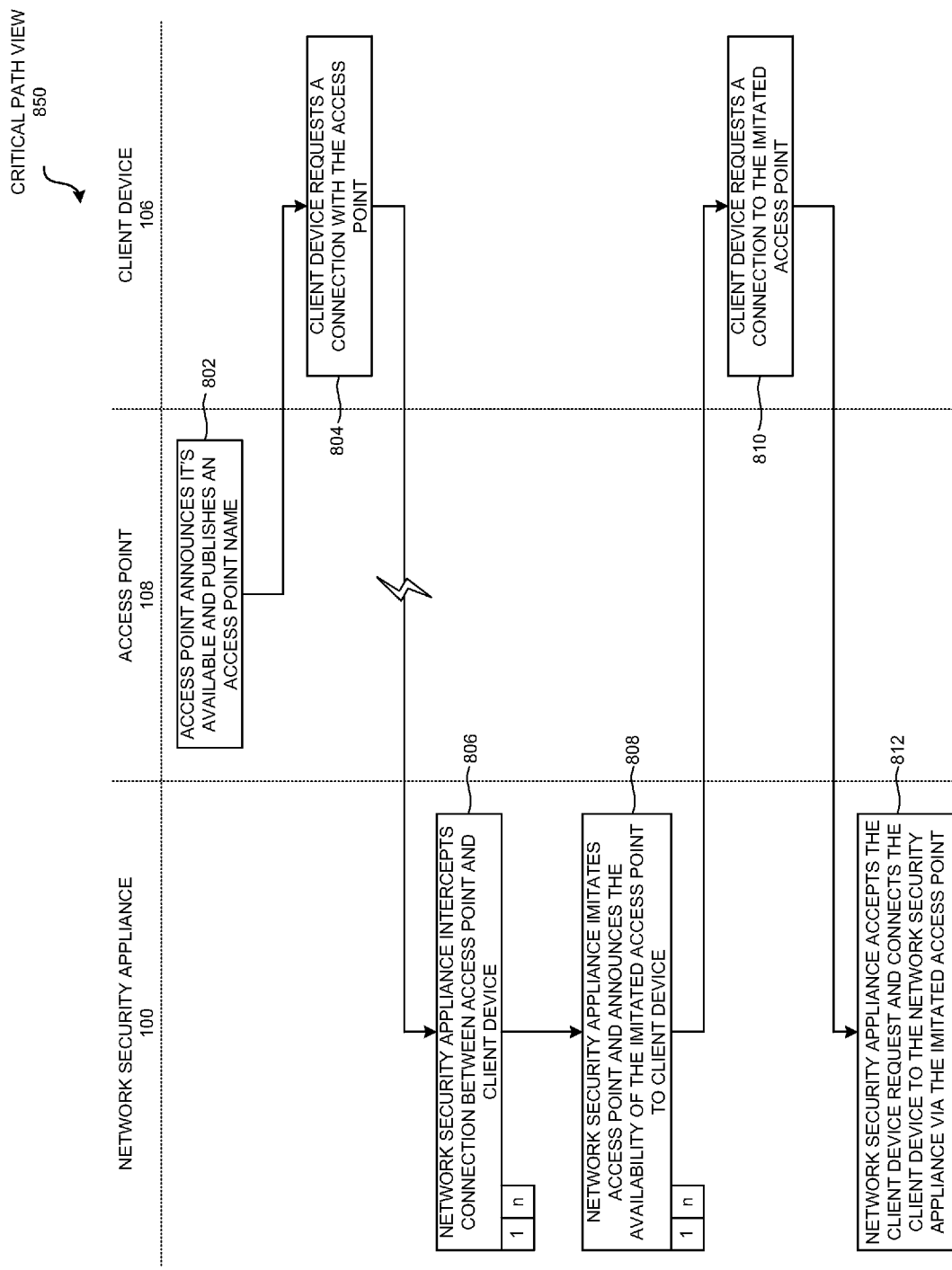
FIG. 8 is a critical path view 850 of the network security appliance 100 of FIG. 1A, according to at least one embodiment.

FIG. 8 is a critical path view 850 of the network security appliance 100 of FIG. 1A, according to at least one embodiment. In operation 802, the access point 108 may announce that it is available and publishes an access point name. In operation 804, the client device 106 may request a connection with the access point 108. In operation 806, the network security appliance 100 may intercept the connection between the access point 108 and the client device 106. In operation 808, the network security appliance 100 may imitate the access point 108 and announce the availability of the imitated access point 112 to the client device 106. In operation 810, the client device 106 may request a connection to the imitated access point 112. In operation 812, the network security appliance 100 may accept the request from the client device 106 and connect the client device 106 to the network security appliance 100 via the imitated access point 112.

In FIG. 8, operation 806, operation 808, and operation 812 are illustrated as example embodiments of operations carried out by the network security appliance 100. Operation 802 is illustrated as an example embodiment of operations carried out by the access point 108. Operation 804 and operation 810 are illustrated as example embodiments of operations carried out by the client device 106.

Figure 9:
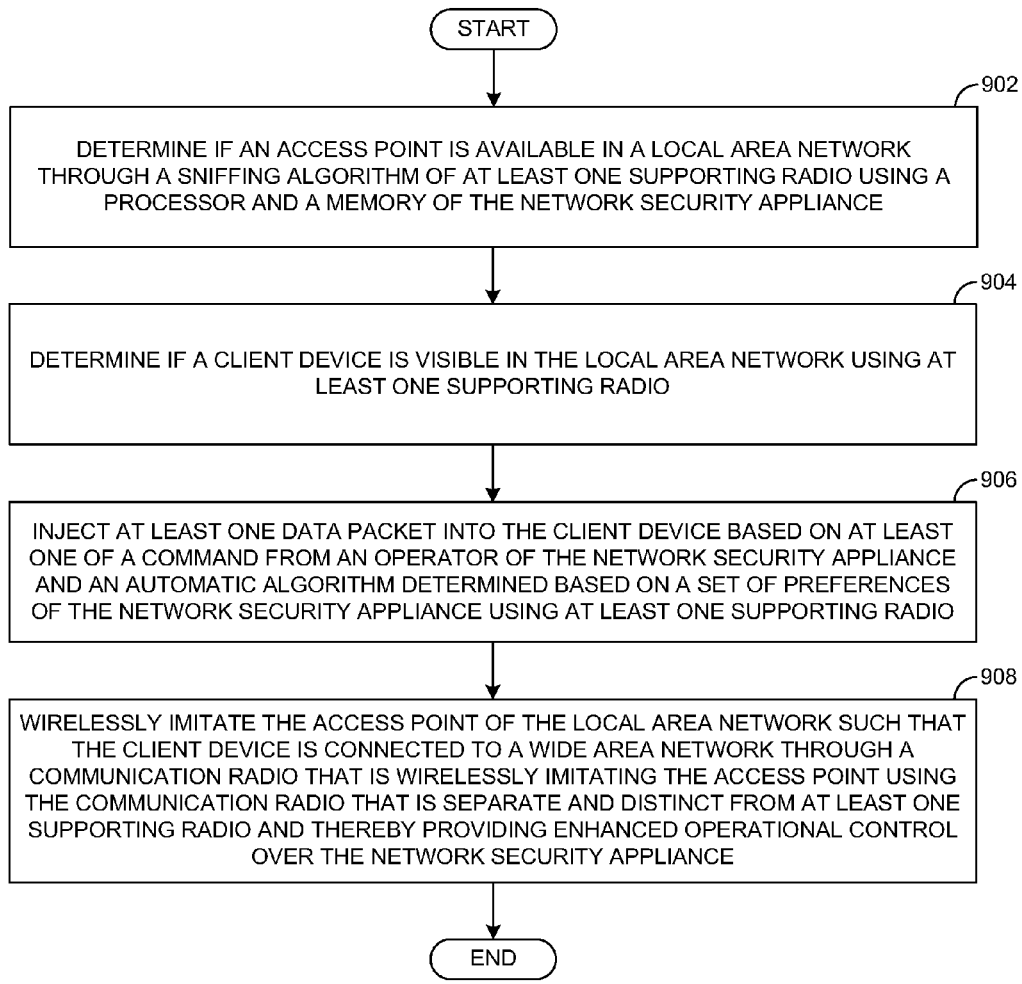
FIG. 9 is a process flow 950 of the network security appliance 100 of FIG. 1A, according to at least one embodiment.

FIG. 9 is a process flow 950 of the network security appliance 100 of FIG. 1A, according to at least one embodiment. In FIG. 9, the process flow 950 may start by determining if an access point 108 is available in the LAN 114 through a sniffing algorithm (e.g., a packet sniffing function 128) of at least one supporting radio 104 using a processor 118 and a memory 120 of the network security appliance 100. From here, the process of the network security appliance 100 may require determining if a client device 106 is visible in the LAN 114 using at least one supporting radio 104. The process may then require injecting at least one data packet 110 into the client device 106 based on at least one of a command from an operator (e.g., operator command 131) of the network security appliance 100 and an automatic algorithm 121 determined based on a set of preferences 129 of the network security appliance 100 using at least one supporting radio 104. Lastly, the process may require wirelessly imitating the access point 108 (e.g., through the imitated access point 112 of the communication radio 102) of the LAN 114 such that the client device 106 is connected to the WAN 116 through the communication radio 102 that is wirelessly imitating the access point 108 using the communication radio 102 that is separate and distinct from at least one supporting radio 104 and thereby providing enhanced operational control over the network security appliance 100. From here, the process may end.

An example embodiment in accordance with FIGS. 1-9 will now be described. Wonderstone Bread Company in New Orleans, La. may have hundreds of employees spread through their central office building near the Old French Quarter. The Chief Executive Officer of Wonderstone Bread Company, Mr. Fred LaPierre may be concerned that secret bread making recipes and trade secret processes may be regularly misappropriated to a competitor, Shark and Gator Breads of Baton Rouge, La. For this reason, Mr. LaPierre may deploy a network security appliance named 'BakerCatch' using the various technologies described in the various embodiments of FIGS. 1-9.

BakerCatch, the company's network security appliance, may perform a penetration testing and vulnerability assessment functions on a wireless network inside of the Wonderstone Bread Company's central office building near the Old French Quarter. The wireless network of Wonderstone Bread Company may not require each node on the network to be physically connected to each other. For example, each computing device sharing the wireless network in the central office building may not require cables (e.g., Ethernet cables) to connect to each other. Therefore cumbersome cables that might be difficult to route through old colonial era buildings (e.g., because the buildings may be made of thick brick, dispersed, and/or routing through walls may be unsightly and/or challenging) may be avoided.

In addition, portions of the central office building may have a heterogeneous topology (e.g., with wired and wireless nodes). A pure wireless topology of the central office building may be compatible with the BakerCatch network security appliance performing the penetration testing and vulnerability assessment function, thanks to the various embodiments described in FIGS. 1-9. The BakerCatch network security appliance may be fast, efficient, and able to respond to dynamic conditions within the network and may have no difficulty managing the numerous devices associated with the network that are connected wirelessly. Therefore devices that are connected to the network wirelessly may be protected from intrusion from external parties. Finally, because Wonderstone Breadstone Company was able to deploy the BakerCatch network security appliance, Wilson Eatwell, an unemployed salesman and previously convicted felon (who previously sold secrets to Shark and Gator Breads) may be caught red handed accessing confidential recipes and emails through his Apple® iPad® tablet staged right outside the central office building, thanks to the various technologies described in FIGS. 1-9. This may save Wonderstone Bread Company millions of dollars in lost profits. Importantly, thanks to the embodiments of FIGS. 1-9, security of the network across Wonderstone Bread Company may be improved.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a non-transitory machine-readable medium). For example, the various electrical structure and methods may be embodied using transistors, logic gates, and electrical circuits (e.g., application specific integrated (ASIC) circuitry and/or Digital Signal Processor (DSP) circuitry).

In addition, it will be appreciated that the various operations, processes and methods disclosed herein may be embodied in a non-transitory machine-readable medium and/or a machine-accessible medium compatible with a data processing system (e.g., network security appliance 100). Accordingly, the specification and drawings are to be regarded in an illustrative rather than a restrictive sense.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A network security appliance, comprising:
   at least one supporting radio:
      to determine if an access point is available in a local area network through a sniffing algorithm,
      to determine if a client device is visible in the local area network, and
      to inject at least one data packet into the client device based on at least one of
         a command from an operator of the network security appliance, and
         an automatic algorithm determined based on a set of preferences of the network security appliance; and
   a communication radio, separate and distinct from the at least one supporting radio, to wirelessly imitate the access point of the local area network such that the client device is connected to a wide area network through the communication radio that is wirelessly imitating the access point to enable the network security appliance to quickly and efficiently respond to dynamic conditions within the local area network thereby simplifying a management of numerous devices associated with the local area network that are connected wirelessly.

2. The network security appliance of claim 1, wherein the communication radio to wirelessly imitate a different access point that was previously communicatively coupled with the client device by accessing a connection history of the client device through at least one supporting radio through the injection of at least one data packet.

3. The network security appliance of claim 1, wherein the wide area network is at least one of an Internet network, a secure private network, and a distributed network.

4. The network security appliance of claim 1:
   wherein at least one data packet to automatically disconnect the client device from the access point when the client device is connected to the access point.

5. The network security appliance of claim 4:
   wherein at least one data packet to include a set of instructions that execute on the client device in a manner such that the client device to automatically request a connection to the communication radio when the set of instructions execute on the client device.

6. The network security appliance of claim 1, wherein at least one supporting radio and the communication radio are on a single printed circuit board forming the network security appliance.

7. The network security appliance of claim 1,
   wherein the communication radio is a rogue access point to operate as a wireless access point installed on a secure company network without explicit authorization from an administrator of the local area network, and
   wherein the rogue access point formed by the communication radio to optionally permit the operator of the network security appliance to conduct a man-in-the-middle attack.

8. The network security appliance of claim 1, wherein at least one supporting radio to perform any one of a function comprising a packet injection function, a packet analysis function, a packet generation function, and a packet sniffing function.

9. The network security appliance of claim 1,
   wherein the client device is specifically targeted by the network security appliance based on a unique identifier associated with the client device, and wherein the network security appliance to inject a series of packets to ensure that the client device that is specifically targeted trusts that the communication radio is the access point.

10. The network security appliance of claim 1, wherein at least one data packet is to convey to the client device that the communication radio is the access point.

11. The network security appliance of claim 1, wherein the network security appliance to transmit to the operator any one of the following:
- an access point list that describes all the access points available in the local area network,
- a connected client device list that describes all the client devices connected to the access points in the access point list in the local area network, and
- an unconnected client device list that describes all the client devices located in the local area network that are not connected to any access point.

12. The network security appliance of claim 1, wherein at least one supporting radio and the communication radio have different ranges of operation, such that at least one supporting radio is able to discover the client devices that are beyond a range of the access point.

13. A network security appliance, comprising:
- a communication radio, separate and distinct from the at least one supporting radio to wirelessly imitate an access point of a local area network such that a client device is connected to a wide area network through the communication radio that is wirelessly imitating the access point to enable the network security appliance to quickly and efficiently respond to dynamic conditions within the local area network thereby simplifying a management of numerous devices associated with the local area network that are connected wirelessly;
- at least one supporting radio to inject at least one data packet into the client device to redirect traffic to the network security appliance based on at least one of
  - a command from an operator of the network security appliance, and
  - an automatic algorithm determined based on a set of preferences of the network security appliance.

14. The network security appliance of claim 13, wherein the communication radio to wirelessly imitate a different access point that was previously communicatively coupled with the client device by accessing a connection history of the client device through at least one supporting radio through the injection of at least one data packet.

15. The network security appliance of claim 13:
wherein at least one data packet to automatically disconnect the client device from the access point when the client device is connected to the access point.

16. The network security appliance of claim 13:
wherein at least one data packet to include a set of instructions that execute on the client device in a manner such that the client device to automatically request a connection to the communication radio when the set of instructions execute on the client device.

17. A method of a network security appliance, comprising:
determining if an access point is available in a local area network through a sniffing algorithm of at least one supporting radio using a processor and a memory of the network security appliance;

determining if a client device is visible in the local area network using at least one supporting radio;

injecting at least one data packet into the client device based on at least one of a command from an operator of the network security appliance, and an automatic algorithm determined based on a set of preferences of the network security appliance using at least one supporting radio; and wirelessly imitating the access point of the local area network such that the client device is connected to a wide area network through a communication radio that is wirelessly imitating the access point to enable the network security appliance to quickly and efficiently respond to dynamic conditions within the local area network thereby simplifying a management of numerous devices associated with the local area network that are connected wirelessly using the communication radio that is separate and distinct from at least one supporting radio and thereby providing enhanced operational control over the network security appliance.

18. The method of network security appliance of claim 17, wirelessly imitating a different access point that was previously communicatively coupled with the client device by accessing a connection history of the client device through at least one supporting radio through the injection of at least one data packet using the communication radio.

19. The method of network security appliance of claim 17:
automatically disconnecting the client device from the access point when the client device is connected to the access point.

20. The method of network security appliance of claim 17:
wherein at least one data packet to include a set of instructions that execute on the client device in a manner such that the client device to automatically request a connection to the communication radio when the set of instructions execute on the client device.

* * * * *